Aug. 12, 1958  L. C. McCARTY, JR  2,847,173
HELICOPTER
Filed Jan. 5, 1956  5 Sheets-Sheet 1

INVENTOR
Lewis C. McCarty, Jr.
By
Kenyon & Kenyon
ATTORNEYS

Aug. 12, 1958 L. C. McCARTY, JR 2,847,173
HELICOPTER
Filed Jan. 5, 1956  5 Sheets-Sheet 2

INVENTOR
Lewis C. McCarty, Jr.
By
Kenyon & Kenyon
ATTORNEYS

Aug. 12, 1958 L. C. McCARTY, JR 2,847,173
HELICOPTER
Filed Jan. 5, 1956 5 Sheets-Sheet 4

INVENTOR
Lewis C. McCarty, Jr.
By
Kenyon & Kenyon
ATTORNEYS

Aug. 12, 1958　　　L. C. McCARTY, JR　　　2,847,173
HELICOPTER
Filed Jan. 5, 1956　　　　　　　　　　　5 Sheets-Sheet 5
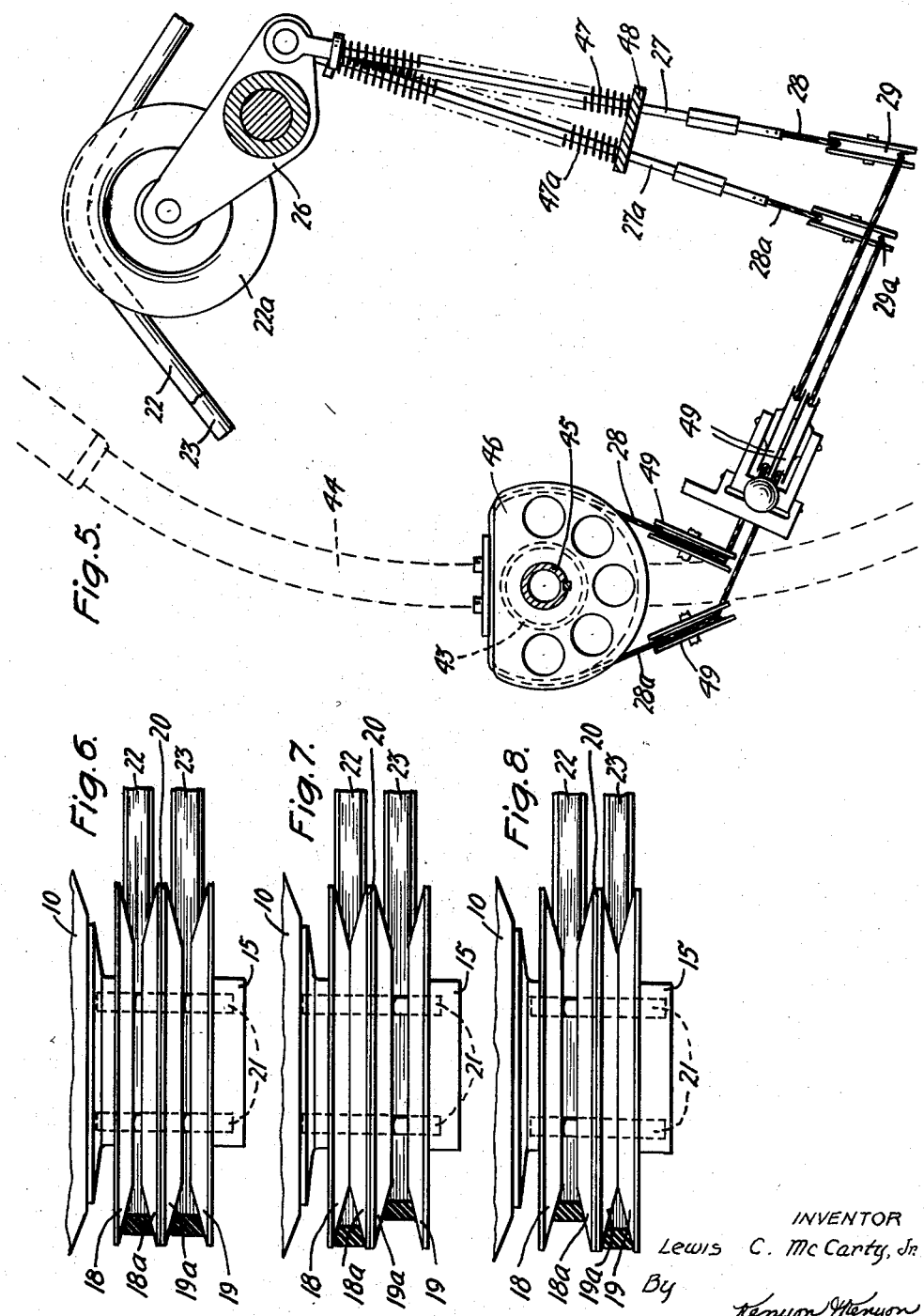
INVENTOR
Lewis C. McCarty, Jr.
By
Kenyon & Kenyon
ATTORNEYS

United States Patent Office 2,847,173
Patented Aug. 12, 1958

2,847,173
HELICOPTER

Lewis C. McCarty, Jr., Toronto, Ontario, Canada

Application January 5, 1956, Serial No. 557,516

13 Claims. (Cl. 244—17.11)

This invention relates to a helicopter or in other words to a heavier-than-air craft which is lifted and sustained in the air by rotors, also called rotary wing means, which turn on a vertical axis and which are rotatively powered.

Prior art helicopters have certain disadvantages. One is the complexity of their construction which makes them expensive to manufacture. Another disadvantage is that their stability is somewhat problematic which, together with their constructional complexities, makes a naturally skillful and well-trained pilot or operator a necessity. These and other disadvantages have prevented the helicopter from becoming a universally used craft in spite of its ability to move vertically, hover and to move horizontally at very slow speeds.

The primary object of this invention is to overcome these disadvantages to a degree providing a helicopter having a low manufacturing cost, comparing favorably with the current cost of an automobile or light airplane for example, and which may be controlled or operated with great simplicity. For example, the simplicity of operation should be such as to permit the operation of the helicopter by an ordinary person of normal skill and with little or no previous flying experience, or by simple equipment which may be remote-controlled. Other objects will become apparent from the following.

As a very general summary, according to the present invention, a helicopter includes a chassis which may be of very simple nature as exemplified by a platform on which the pilot or operator may stand erect, or a simple arrangement providing a support for remote-controlled operating equipment. A rotor shaft is connected rigidly to this chassis and extends downwardly therefrom, and mounted on this shaft is the rotary wing means which includes a hub assembly comprising coaxially mounted rotor hubs, intergeared for counter-rotation, and rotor blades extending radially out from the rotor hubs.

The center of gravity of the helicopter when loaded is located above the hub assembly. The helicopter is designed to carry a laterally shiftable weight for shifting its center of gravity laterally so as to tilt the helicopter when in flight. This is the only means required to put the craft into horizontal motion from its hovering condition. The shiftable weight may comprise the body weight of the pilot or operator standing on the described platform, or it may be a dead weight which may be shifted laterally by the remote-controlled equipment.

The rotors have elastically flexible, rigidly mounted blades which are radially exposed to free air and which are dimensioned in relation to the helicopter's weight to provide rotor loadings that are generally conventional in the helicopter art and which should at most be not more than about 7 pounds per square foot of the rotor disk area. The blades are not mounted for either flapping or teetering control and their pitch need not be controlled in any way although in some instances this may be desirable. Because the blades are rigidly mounted great simplicity of construction is possible.

Blade tip spacing vertically between the two rotors is not more than about 12% of the radius of the rotors, this keeping the helicopter design generally compact. The rotor blades have positive coning angles and the blades of the upper rotors have a somewhat greater coning angle than do the blades of the lower rotor. This permits the two rotor hubs to be spaced very closely together, while the different coning angles provide the blade tip spacing described.

When a helicopter moves horizontally in flight the rotor blades on the retreating side of the rotor disk do not provide as much lifting effort as do the blades on the advancing side of the disk. This introduces the rolling force and has in turn necessitated the use of flapping or teetering rotor blades or cyclic blade pitch control. With counter-rotation rotors coaxially mounted this rolling force is still present and may cause trouble if transmitted rigidly to the common rotor shaft through the necessary rotor hub bearings.

In the case of the present invention the rigidly mounted blades are elastically flexible and can flex so as to absorb or avoid such forces. This might cause blade tip interference between the two rotors if it were not for a special rotor blade design. Thus, the rotor blades of the present invention have tip portions which are sufficiently flexible to bending stress to absorb and avoid the disturbing forces when the helicopter tilts and moves horizontally in flight. However, the blades progressively increase in bending stiffness towards their inner ends so as to restrain their tip portions sufficiently to prevent blade interference between the rotors. In other words, the blades progressively decrease in bending stiffness from their inner to their outer ends and, more specifically speaking, decreasing so that their mean bending stiffness outboard of their radial mid-points is about from 10% to 25% of their mean bending stiffness inboard of these mid-points. Even more specifically, the blades have a bending stiffness which varies inversely in proportion to the ratios of the blades' lengths to the lengths from the tips of the blades to the station measured raised to an exponential power of about from 4.5 to 5.75.

Rotor power is obtained from a motor mounted on the chassis and having a power transmission to the rotors which includes an overruning clutch so that auto-rotation of the blades occurs if the motor is suddenly slowed or stopped while the helicopter is in flight. The transmission also includes means for intergearing the rotors positively so that they rotate in opposite directions, along with a means for varying the torque distribution between the rotors. This last means is adjustable and provides an azimuth control for the chassis on which the motor is mounted.

When the chassis comprises a platform on which the pilot or operator stands, the invention provides for a rigid column which extends upwardly from the platform and is rigidly connected to the latter. This column mounts a steering wheel or handle bar which is connected so as to adjust the rotor torque distribution means. With this arrangement the pilot or operator stands naturally erect for hovering, leans in the desired direction of horizontal flight and turns the steering wheel or handle bar for azimuth control. The only additional control needed is a control for the motor so that its speed may be varied.

Such a helicopter requires practically no skill or training to operate. The craft is inherently stable. When the pilot or operator leans forwardly to shift the center of gravity in that direction, the craft remains stable because of the positive coning angles of the blades and because the center of gravity is higher than the hub assembly. Both of these features tend to tilt or shift the helicopter backwardly so as to balance the shifting weight of the pilot's body.

Due to the excellent stability of this new craft it is possible to use remote-controlled arrangements for shifting a dead weight arranged so as to shift the center of gravity and control the craft. For example, a farmer might at a cost comparable to that of a good farm tractor purchase and use such a remote-controlled helicopter for the spraying of his fields.

The helicopter of the present invention may also be used to lift suspended loads providing this is done so that the helicopter's center of gravity remains above the hub assembly, or close to it.

It is to be noted that the described stability cannot be obtained by the use of very highly loaded rotors of the ducted type. When tilted a ducted rotor has characteristices which make it tend to keep on tilting regardless of whether or not the center of gravity is located above the rotors' hub assembly. Because of this characteristic the use of ducted rotors demands an extremely skillful operator if provided with a chassis of the platform type. Alternately, the operator could provide himself with wings and let himself be driven into horizontal flight with his body acting as a fuselage and relying on great ankle strength to tilt the rotor and return himself to a vertical position when hovering was again desired. Obviously this ducted rotor type of helicopter cannot provide the advantages of the present invention using the more lightly loaded, radially open rotors.

A specific example of a helicopter embodying the present invention is illustrated by the accompanying drawings in which:

Fig. 5 is a cross section showing the manner in which the handle bar on top of the column connects so as to control the rotor torque distribution;

Fig. 6 is a detail of parts taken from Fig. 3 and shows these parts as they appear when the torque is evenly distributed between the rotors;

Fig. 7 is like Fig. 6 excepting that it shows the parts as they appear when the torque is increased on the lower rotor and decreased on the upper rotor;

Fig. 8 is again like Fig. 6 excepting that it shows the parts as they appear when the torque increased on the upper rotor and decreased on the lower rotor;

Figure 9:
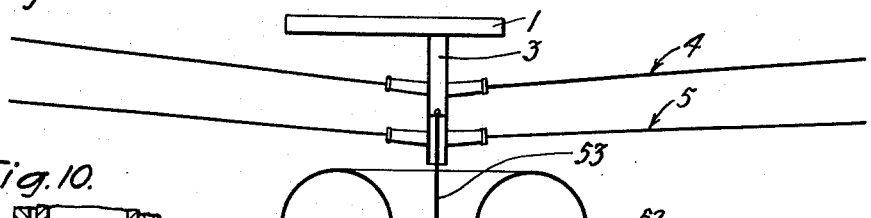
Figure 10:
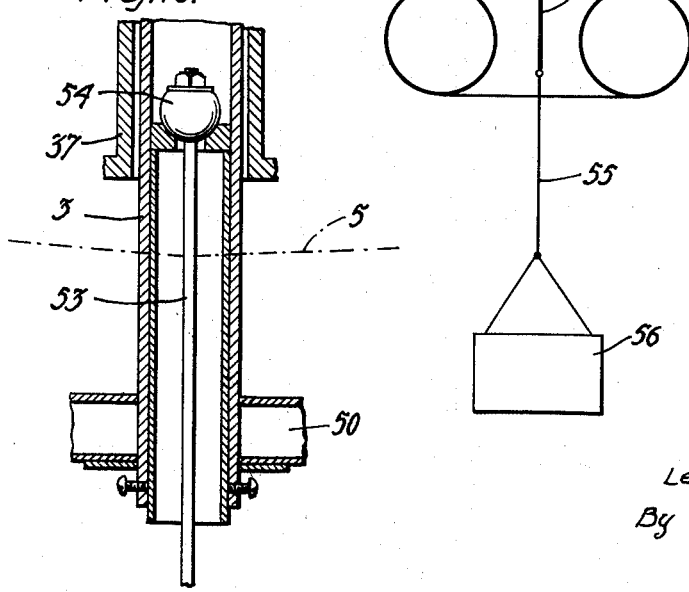

Fig. 9 schematically shows how the illustrated helicopter may carry a suspended load or weight; and Fig. 10 is a vertical section showing details of the suspended load or weight suspension system.

In this illustrated craft the chassis 1 is in the form of a platform on which the operator or pilot 2 stands. This platform 1 may be assembled from a plurality of parts but it is in effect a rigid unit.

The rotor shaft 3 is connected rigidly to the chassis 1 and extends downwardly therefrom, and this shaft 3 is, of course, rigid. The counter-rotation rotors 4 and 5 are coaxially mounted on the shaft 3, the rotor 4 being located above the rotor 5.

Figure 1:
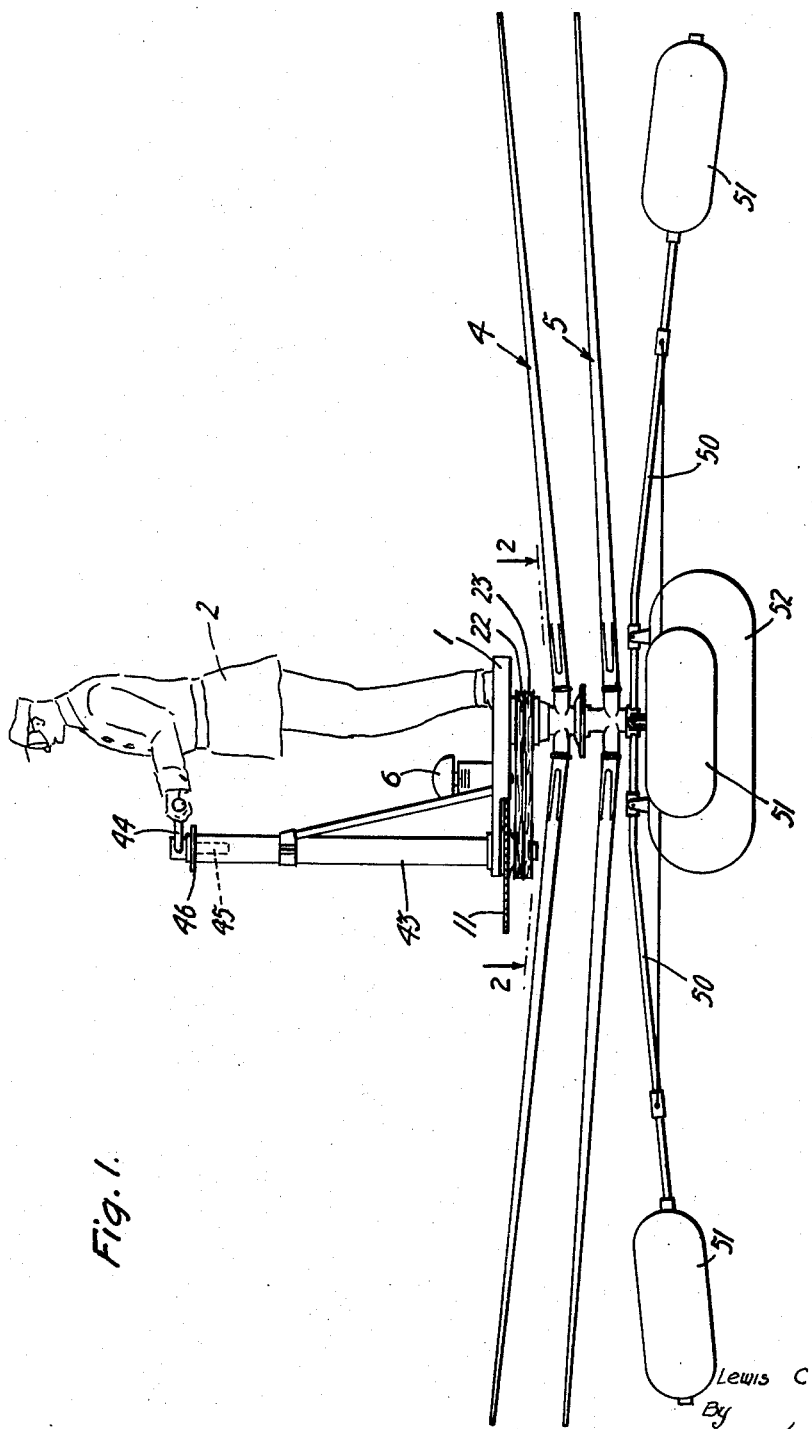
Fig. 1 is a side view or elevation of the helicopter.

In Fig. 1 the center of gravity G is indicated by a cross. The center of gravity G is always located above the hub assembly, the vertical distances separating G and the center of the hub assembly being largely a matter of design. The center of gravity G must be high enough to make the craft stable but it should not be so high as to make the craft unreasonably stiff to tilting when in flight. When the chassis 1 forms a platform on which the pilot or operator stands his body weight shifts the center of gravity upwardly but since his body is laterally shiftable control flexibility is retained. If a shiftable dead weight is substituted for the human body weight the same effect is obtained if the dead weight is located above the hub assembly.

Figure 3:
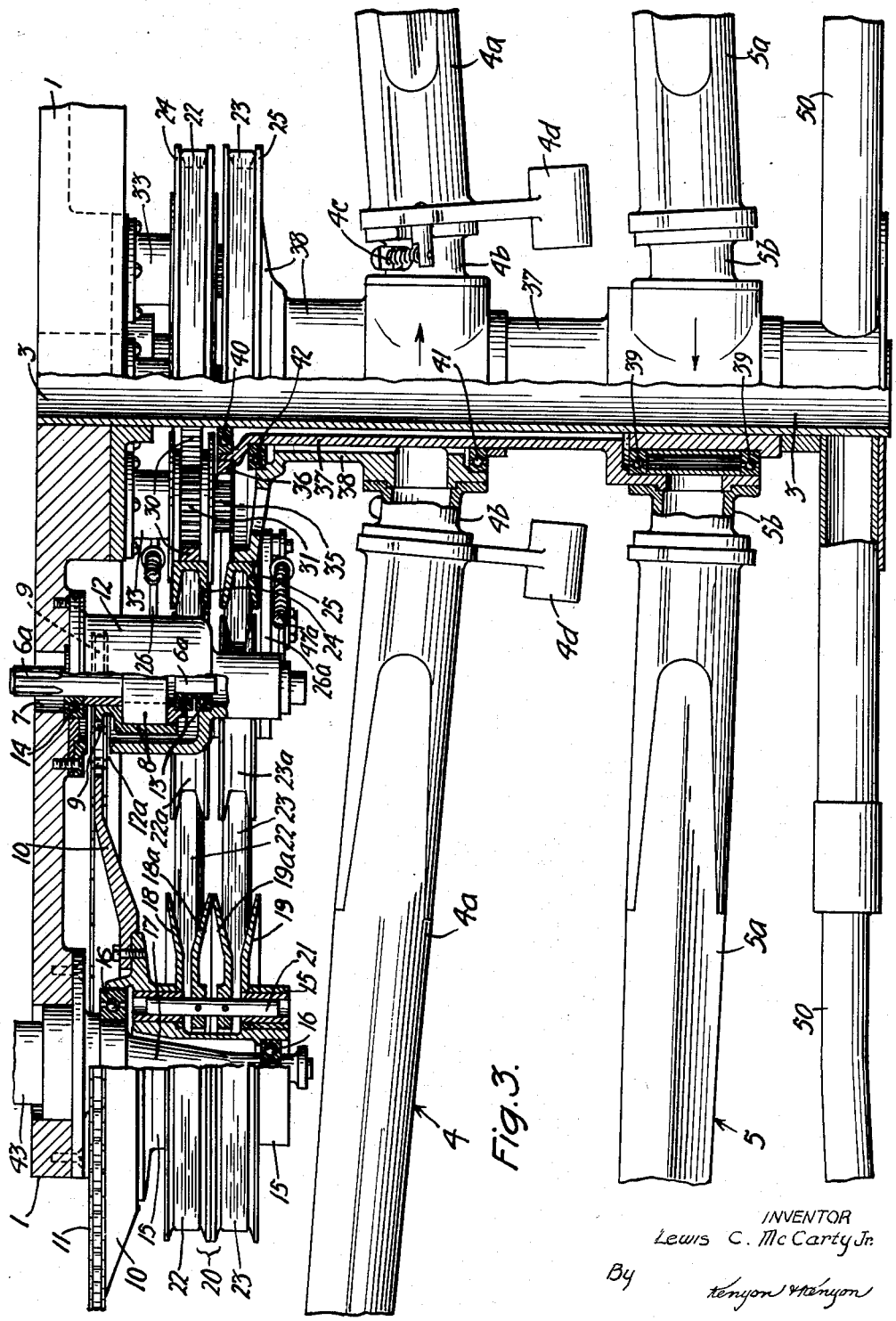
Fig. 3 shows the power transmission and rotor torque distributing mechanism, this view being partly in vertical section and partly in elevation.

As previously explained, the rotors 4 and 5 have elastically flexible blades 4a and 5a, partially shown by Fig. 3 in enlarged scale. The airfoil form, blade pitch, the structural materials, and other similar design matters may follow conventional practices excepting where otherwise indicated.

The blade roots 4b and 5b are rigidly mounted, and the blades are radially exposed to free air. There is no flapping or teetering action involved and ducted rotors are not used. Although it may be desirable to change the blade pitch automatically this is not a necessity and the illustrated craft has been flown successfully and repeatedly with all of the blades rigidly mounted against any motion whatsoever except elastic flexure.

Extremely high rotor leading is also avoided, in the sense that the loadings of small-diameter high-speed ducted rotor loadings are high. Generally speaking, conventional rotor loadings may be used, such as in the neighborhood of 1.75–2.8 pounds per square foot of rotor disk area. However, rotor loadings of as high as 7 pounds per square foot of rotor disk area are possible if the disadvantages of such high rotor loadings are considered tolerable.

The blades of both rotors 4 and 5 have fixed positive coning angles as is shown by Fig. 1. The blades of the rotor 4, which is the upper rotor, have a greater positive coning angle than do the blades of the lower rotor 5. Useful coning angles are from about 2° to about 6°, the exact coning angles used being largely design matters providing both coning angles are effectively positive.

Because the two rotors 4 and 5 flare radially with respect to each other, the rotor centers may be and should be spaced closely together. The vertical space between the tips of the blades 4a and the tips of the blades 5a should not be greater than a vertical distance which is 12% of the radius of the rotors. This is an unusually close tip spacing for coaxial rotors and this close spacing would cause trouble were it not for the features of the present invention. All of the blades 4a and 5a, of the two rotors, should be made with tip portions which are sufficiently flexible to bending stress to absorb rolling forces when the helicopter tilts and moves horizontally in flight. These rolling forces, of course, result from the fact that as a helicopter rotor moves forwardly in flight the blades move into the air flow, due to the horizontal movement, on one side and with or away from this air flow on the other side of the rotor. The advancing blades naturally have more effect than do the retreating blades and there is, therefore, a rolling tendency about the line of flight as an axis, roughly speaking. With coaxially mounted counter-rotation rotors, rigidly mounted on the rigid shaft as disclosed, these rolling forces tend to cancel each other but they must be carried through the rotor blades to the rotor centers where they tend to cancel each other. Thus high stresses would result at the rotor centers and in the rotor shaft, and, of course, in the rotor blades, were it not for the fact that the elastically flexible blade tip portions absorb these rolling forces gradually in a shock-absorbing manner.

It is to be noted that the very close spacing between the centers of the rotors greatly reduces the lengths of the oppositely directed stress in the shaft created by the rolling forces which are absorbed by the rotor blades and are transmitted to the shaft through the hub assembly, which is naturally desirable. At the same time, this close spacing provides for great compactness while still placing the helicopter's center of gravity above the hub assembly.

The rotor blades are braced against excessive vertical motion, due to their flexure by the rolling forces, by constructing the blades so that they progressively increase in bending stiffness towards their inner ends. This bending stiffness increase should be made so as to restrain the blade tip portions sufficiently to prevent blade interference between the rotors when the helicopter is in horizontal flight.

Given these design dictates those skilled in the art can design the rotors by applying the principles of cantilever design and helicopter rotor design.

The rotor blades should not progressively decrease in stiffness radially outwardly in a linear fashion. Instead, the blades should progressively decrease in bending stiffness from their inner to their outer ends so that mean bending stiffness outboard of their radial midpoints is about 10% to 25% of their mean bending stiffness inboard of these mid-points. As a practical working rule, the blade bending stiffness should vary inversely in proportion to the ratio of the blade's length to the length from the blade tip to each station measured, raised to an exponential power within the range of about from 4.5 to 5.75.

Difficulty is experienced in explaining this blade stiffness phase of the present invention, because it is necessary to embrace large variations in the weight and size of the helicopter and other possible variables. It can be seen, however, that the idea is to provide a rotor blade which is very stiff at its inner or root end, which maintains the stiffness outwardly for a substantial distance, so as to maintain the positive coning angularity relatively rigidly, the blade, as it approaches its tip, rather rigidly decreasing in bending stiffness so as to provide relatively flexible tip portions. This, in conjunction with the rigid blade mountings and the close spacing of the rotors at their axis, and the radially outward flare of the space between the rotors, all cooperate together. The result is a completely operable assembly, providing great hovering and speed stability and a stability which is maintained during vertical movement. The blades are rigidly mounted and the construction is very simple generally.

In the illustrated example of the invention, the rotors are powered by a motor 6 which is mounted on the chassis 1. This small helicopter is essentially a one-man craft, and it uses a high-efficiency marine outboard motor providing a vertical power shaft 6a which projects downwardly through a hole 7 formed vertically through the chassis 1.

This vertical power shaft 6a connects through an overrunning clutch 8 with a horizontal sprocket wheel 9 of small diameter, connected to a horizontal sprocket wheel 10 of large diameter, the connection being through a sprocket chain 11, so as to provide a simple reduction gear. A housing 12 protects the clutch 8 and also mounts an outboard bearing 13 for the shaft 6a, this shaft having an inboard bearing 14 mounted by the inner end of the housing 12 and the latter being rigidly connected to the bottom of the chassis 1.

Obviously the shaft 6a need not be integral with the crankshaft or other parts of the motor 6, the shaft 6a in Fig. 3 being shown as a short shaft having a splined upper end so that it may be removably coupled to the motor 6. This permits ready removal of the motor for servicing and replacement.

A window 12a is formed in the housing 12 to permit the passage of the chain 11. The overrunning clutch 8 may be of any practical prior art design. This clutch is for the purpose of permitting autorotation of the rotors when the helicopter is in flight and the motor 6 is slowed or stopped.

The balance of the necessary power transmission or system of the two rotors permits relatively free rotation of the rotors as required for autorotation. This transmission or system also positively intergears the two rotors for counter-rotation. In addition, this transmission or system provides for varying the torque distribution between the two rotors both when they are powered by the motor and during autorotation of the rotors.

As shown by Fig. 3 in particular, the large sprocket wheel 10 is mounted on a hub 15 journaled by bearings 16 on a stub axle 17 rigidly connected to the bottom of the chassis 1 and depending therefrom.

According to the present invention this hub 15 mounts a novel dual sheave assembly of the variable diameter type.

This sheave assembly comprises the upper wall member 18 of one sheave and the lower wall member 19 of the second sheave, both of these wall members being rigidly secured to the hub 15. The lower wall 18a and the upper wall 19a, required to cooperate with the walls 18 and 19, respectively, are formed by a single element which floats vertically. This element, indicated generally at 20 is slidably carried by vertical bars 21 forming a part of the hub 15 which is in the form of an assembly. These bars 21 rotate with the hub so that all of the sheave walls rotate together.

These sheave walls 18 and 18a, and 19 and 19a, respectively define conical grooves in which V-belts 22 and 23, respectively, ride. By arrangements described hereinafter, the belt 22 drives the rotor 5 and the belt 23 drives the rotor 4. Both belts turn in the same direction but as described hereinafter there is a rotary motion reversing system between one of the belts and its rotor. For the present it is sufficient to understand that the other end of the loop of the belt 22, rides in a sheave 24, while the other belt loop, of the belt 23 rides in a sheave 25.

To obtain the rotor torque distribution, which is one of the features of the present invention, the belts 22 and 23 are alternately tensioned and slackened so that the sheave element 20 is shifted upwardly or downwardly whereby to decrease one sheave diameter while increasing the other sheave diameter. The action is shown by Figs. 6 through 8. In Fig. 6 the two belts are tensioned equally and the element 20 is riding at a mid-point between the sheave walls 18 and 19 so that the belts 22 and 23 are being driven by sheaves of the same effective diameter. The V-belts naturally shift into their conical sheave grooves to a depth, or loop radius, determined by the sheave wall spacing. In Fig. 7 the belt 22 has been slackened and the belt 23 has been tightened, the effective sheave diameter differences being shown by this figure. In Fig. 8 it is the belt 22 that has been tightened while the belt 23 is loosened or slackened. It can be seen that the torque distribution between the sheaves 24 and 25 can be varied quickly, and with good control, by this very simple arrangement.

Figure 4:
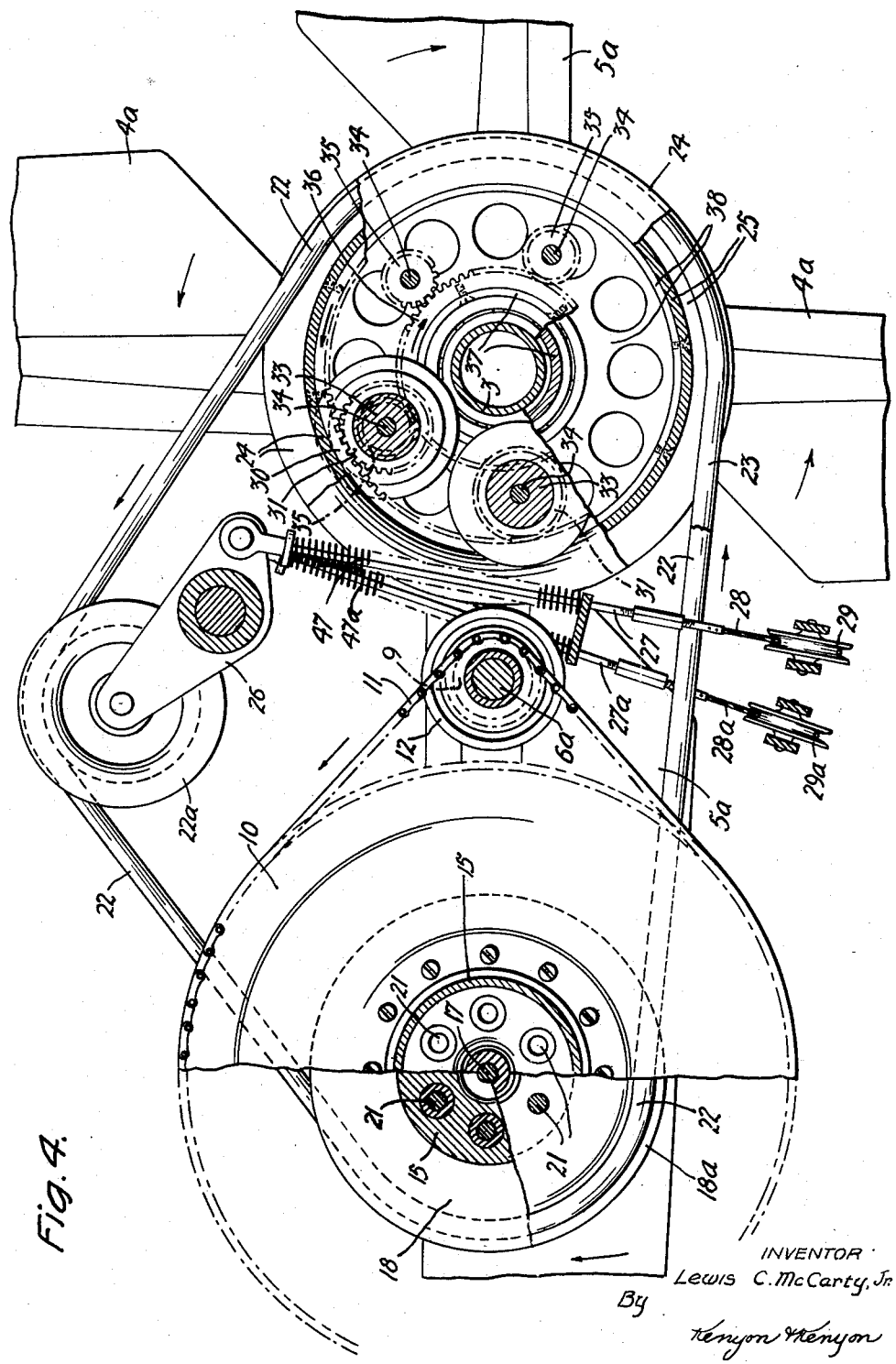
Fig. 4 is a cross section taken on various horizontal planes through the transmission and torque distribution system of Fig. 3.

Figs. 3 and 4 show the manner in which the two belt loops are controlled. In each case the belt loop side which does not carry power is looped over a third sheave, and the position of this sheave is adjustable. Reference to Fig. 3 shows that the belt 22 is looped over the third or idle sheave 22a while the belt 23 is looped over the third or idle sheave 23a. Fig. 4 shows how the sheave 22a is mounted on one arm of a two-armed lever 26, the other arm of this lever is connected to one end of a long turnbuckle 27, the other end of which is connected to a cable 28 which bends around a sheave 29 and goes upwardly through the platform or chassis 1. The entire torque distribution system is shown in its neutral position by Figs. 3 and 4, so the sheave 23a does not show in the latter figure. However, it can be seen in Fig. 3 along with a two-armed lever 26a which is a companion to the lever 26. In this case also the free lever arm connects through a long turnbuckle 27a which, in turn, connects with a cable 28a which bends around a sheave 29a and goes upwardly through the chassis.

Now it becomes apparent that from above the chassis one of the cables 28 and 28a can be relaxed while the other one is pulled so as to slacken and tighten the V-belts 22 and 23 whereby to vary the torque distribution between the two rotors. It is to be noted that this torque distribution system is between the overrunning clutch 8 and the rotor driving sheaves 24 and 25, so the torque distribution system remains effective during autorotation of the rotors.

The previously mentioned rotation reversal of one of the rotors, occurs within the sheaves 24 and 25 which are hollow. The sheave 24 mounts an internal ring gear 30 within which are meshed a plurality of pinions 31 journaled by bearings 33 mounted on the bottom of the platform 1. These pinions have flanges shaped to mount the sheave 24 rotatively while locating it axially. These pinions are in each instance keyed to a shaft 34, running in its bearing 33, and on this shaft 34 below the pinion 31, is keyed a pinion 35, in each instance. Each pinion 35 meshes with an external ring gear fixed to a hub 37 mounting the blades of the lower rotor 5.

It can be seen that it is the rotor 5 which is driven reversely with respect to the travelling direction of the belts 22 and 23. The sheave 25 connects directly with the hub 38 on which the rotor 4 is mounted. The previously described gearing, which reverses the motion for the rotor 5, provides a 1 to 1 gear ratio. The belts 22 and 23 interconnect the sheaves 24 and 25 so that the two rotors are positively intergeared for counter-rotation at all times. This interconnection is through the torque distribution assembly comprising the parts 15 through 21 and, of course, including the belts 22 and 23 and their tensioning means 22a and 23a and their control equipment. Both during powered flight and autorotation the two rotors are under complete control both as to their rotating directions and the manner in which the torque is distributed between them. It is to be understood that this control is under the influence of the cables 28 and 28a.

As previously explained, the rotor shaft 3 is rigidly connected to the chassis or platform 1 and this shaft is normal to the chassis. The hub 37 is journaled on the shaft 3 by bearings 39 and 40, and the sub 38 encircles the hub 37 and is journaled on the latter by bearings 41 and 42.

The roots of the blades 4a are mounted by the hub 38 and the roots of the blades 5a are mounted by the hub 37. The usual kind of root receivers may be used and the details do not require description.

All of the blades are mounted rigidly insofar as flapping or teetering are concerned. All of the blades may be mounted rigidly with respect to pitch changing although this is not an absolute necessity, and in some instances it may be desirable to provide for changes in the blade pitch.

For example, as shown by Fig. 3 the blades 4a are at 4b rotatively mounted by the hub and each blade is provided with a centrifugal weight 4d, each blade having a spring 4c which biases the blade against rotation due to the centrifugal force of the weight 4d. These weights 4d naturally are offset from the blades' longitudinal axes and apply a rotative force to the blades 4a as the rotary speed of the rotor 4 increases. In some instances it may be desirable to provide a manual control for varying the blade pitch. In all cases it is important to note that the illustrated machine has been operated with complete success when all of the blades were fixed rigidly against all of the usual movements including pitch changing. In other words, the only motion imparted to the blades of necessity is the rotary motion about the axis of the shaft 3, in the case of the illustrated machine.

Operation of the illustrated machine is facilitated by providing the operator or pilot 2 with a rigid upstanding column 43 which is rigidly connected to the chassis or platform 1. In the illustrated machine this column is made large enough in diameter to form a fuel tank for supplying the motor 6 with fuel. At the top of this column 43 a handle bar 44 is provided for the pilot or operator, this handle bar being like that which is used by motorcycles. For example, one of the grips may be made to rotate in the usual fashion and connected with the throttle of the motor 6. Also, this handle bar 44 connects with a shaft 45 which is journaled rotatively in the upper end of the column 43. To the shaft 45 is keyed a quadrant 46 about which the cables 28 and 28a are looped and fastened. The compression coil springs 47 and 47a encircle the turnbuckles 27 and 27a, respectively, and work against an abutment 48 so as to bias the handle bar 44 to its neutral position where the two belts 22 and 23 ride at their neutral positions. Exact adjustment is effected and maintained by the use of the turnbuckles 27 and 27a. The cables 28 and 28a may be properly guided by the use of appropriately placed guiding sheaves 49.

As a landing gear the illustrated helicopter has a spider 50 connected to the bottom of the shaft 3, the latter projecting beolw the hub 37 for this purpose. The ends of this spider are provided with a plurality of air-inflated balloons 51 made of material tough enough to resist tearing during either land or water landings. The central portion of the spider may be provided with a large doughnut or biscuit shaped balloon 52 which additionally acts as a shock absorber and float element.

Although the spider 50 is shown as mounting the elements 51 inside of the circumference of the two rotors 4 and 5, these elements 51 may be extended and preferably are extended beyond the disk area of the two rotors where the relatively bulky balloon-like members are free from the down draft of the rotors.

Proper design may permit the use of the bodies 51 to control the center of gravity of the craft. For example, each of the elements 51 may be partly filled with a liquid, which could comprise the cooling liquid for the motor 6, and pumps used to distribute the liquid between the bodies 51, which would then function as tanks and could, of course, be made of material that is either flexible or rigid. It is also apparent that the rotors might be powered by jet motors located at the rotor tips. Various other types of power transmissions are possible, such as hydraulic and other types. Due to the excellent stability of the craft the chassis of platform 1 could be provided with seats for the pilot or operator or possibly a passenger or two in case the shiftable weight control provided is adequate for its purpose.

When the craft is used to lift or carry a load the stability of the craft may be maintained by supporting the load from a tension rod 53 extending up the hollow rotor shaft 3 to a location near the center of the hub assembly at which point the rod 53 is connected to the shaft 3 by a universal joint connection 54. Fig. 9 schematically shows how the lower end of the rod 53 may be connected by a rope 55 with a load 56.

With the above arrangement when the helicopter goes into forward flight air friction on the rope 55 and the load 56 swings these parts backwardly. However, since the load is connected to the helicopter at or just about at the center of the hub assembly, within the limits of the swinging action of the rod 53 within the shaft 3, the usual pitching characteristic of a helicopter carrying a suspended load, is avoided. This dangerous tendency is reduced greatly even when the rod 53 swings into engagement with the lower end of the shaft 3, because the lower end of this shaft is so close to the center of the hub assembly.

Figure 2:
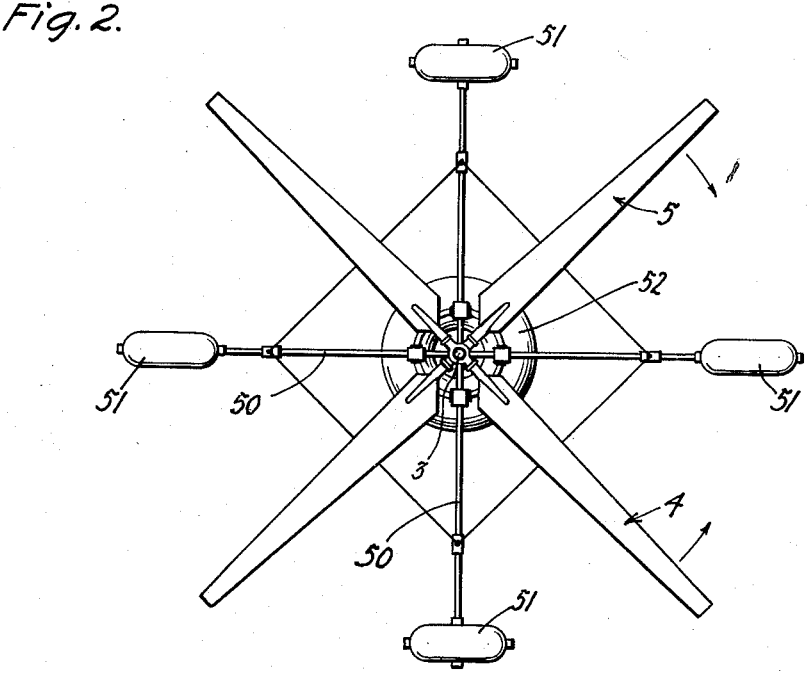
Fig. 2 is a cross section taken on the line 2—2 in Fig. 1.

As can be seen from Fig. 2, the illustrated helicopter uses two-bladed rotors. The use of coaxial rotors provides adequate disk solidity and the other features of the invention contribute to make this rotor arrangement thoroughly satisfactory.

When using a shiftable weight with a suitable mechanism for shifting it, the previously suggested remote-control equipment may be of the radio-control type.

In the operation of the illustrated helicopter, assuming that the motor 6 is operating and that the pilot or operator 2 is standing on the platform 1, the craft is caused to rise simply by accelerating the motor 6. Should the platform start to rotate in azimuth the operator uses the handle bar to change the torque distribution between the rotors to a point where the platform is stationary. The craft is completely stable. Although the center of gravity has been described as being above the center of the hub assembly, it need not be exactly axially above and aligned with the center. However, it should be substantially aligned axially.

The operator with a normal sense of standing balance automatically stands as required to keep the craft's center of gravity directly above the hub assembly so that the helicopter does not tilt inadvertently. A deliberate shift of the center of gravity is required to tilt the helicopter.

When horizontal flight is desired the operator uses the handle bar as required to orient himself in azimuth, and, of course, the platform on which he stands, in the desired direction, and he then leans forwardly so as to shift the craft's center of gravity in that direction.

Tilting of the helicopter is opposed by two forces, one is due to the center of gravity being above the hub assembly, forward shifting of this center of gravity being opposed by the effort exerted by the rotors. Also, due to the positive blade coning angularity, the forward half of the rotors level into the air flow created by forward flight so that this air flow has little effect on the net air inflow, while the rear or trailing half of the rotors angle more into the air flow created by the horizontal flight so that their net air flow increases with a consequent decrease in the resulting effort.

Due to the above the operator must remain leaning forward to keep the helicopter in horizontal flight and the craft has complete speed stability. Faster flight requires a further shift forward of the center of gravity and for each shift the craft reaches a speed which is maintained uniformly in stable equilibrium in response to external disturbances. Whenever the operator shifts his weight backwardly the craft comes to a standstill and hovers in a stable fashion.

Due to the positive blade coning angles the craft is stable with respect to wind disturbances. Although the craft may be blown with the wind its attitude is not changed by the wind substantially and if changed the craft forces itself back to the attitude fixed by the location of the center of gravity following a stable phugoid oscillation.

Note that none of the above effects are possible in the case of a ducted rotor arrangement. Both rotors must be radially aerodynamically exposed to free air.

If the motor is suddenly throttled to a slow speed, or fails, the overrunning clutch 8 permits autorotation of the rotors so that the craft settles gently at a rate determined by the rotor loading. Because the two rotors are intergeared for positive rotation they cooperate during autorotation and in the event of a motor failure the craft does not go out of control. The handle bar control is, of course, effective during an autorotation descent.

When in horizontal flight the operator or pilot is not subjected to disturbing vibration caused by the rolling forces exerted on the rotor blades. These absorb these forces smoothly and bring them together at the center of the hub assembly where the rolling forces cancel. Due to the novel distribution of bending stiffness the blades do not deflect so as to cause interference between the two rotors.

The overall simplicity of this novel craft, the obvious fact that it may be inexpensively manufactured and the safety due to its inherent simplicity are obvious. The practically complete stability of the craft, the great ease with which it may be controlled by anyone regardless of previous flying experience, and the generally great controllability of this new craft can be appreciated by observing its operation.

In the foregoing the rotors are described as being radially open to free air, but it is to be understood that this means in the aerodynamic sense. Screening or caging may be used for blade tip protection, providing such protecting structure is open to radial air flow.

It has been noted that the novel rotor blade design prevents blade interference during horizontal flight. Such interference is particularly apt to occur during the stopping and starting transitions of the rotor in cross-wind conditions. Even in such instances the upper and lower blades do not interfere with each other.

The use of a shiftable weight, other than the operator's weight, has been described in connection wtih remote control. However, it may be desirable to provide such weight for pilot operation, and to make the weight shiftable in response to the pilot's control or action, or in response to inertial guidance.

Since the rotors are driven through the belts, they are driven frictionally. Therefore, the rotors can override the motor if necessary.

Note that this helicopter can be controlled when afloat on water, just as it is when in the air. The central float 52 is in the form of a hollow ring of substantial displacement and is located at a lower level than the floats 51. Also, the arms of the spider 50 are somewhat elastically flexible. These arms and the floats 51 make the craft stable but permit the shifting of the weight to tilt the craft so that it propels itself, azimuth control being obtained, if desired, as described before. By mutually aligning the floats 51 forwardly the craft is made somewhat directional and by tilting forwardly slightly to port or starboard, as desired, it may be steered.

For a running lift from the water, it is desirable to shape the floats 51, in accord with naval designing, so as to prevent the hydrodynamic forces from burying these floats, and to prevent undesirable uplift of excessive spray. Thus, square sterns and extended stem spray-breaking boards are indicated.

When located as illustrated, in flight the floats 51 provide a desirable stabilizing effect. They act as obstacles to downward air flow, the forward ones becoming inactive, as such obstacles, in forward flight, while the rear ones remain active. Hence there is a righting effect which increases even further the speed stability of the helicopter.

When pilot operated, a pilot's seat may be provided. This may be mounted on a vertical sway bar or flexible column to permit the pilot to shift his body to control the horizontal motion. Such an arrangement is easily visualized although not illustrated.

Even though a suspended load is connected to the helicopter below its center of gravity, operation may be safe, providing the load is not excessive.

I claim:

1. A helicopter comprising rotary wing means having a central hub assembly and blades extending radially therefrom, said blades being unrestricted as to flapping movement except as restrained by their root end connections to said hub assembly; a load carrying chassis mounted above said rotary wing means; and means connecting said chassis to said rotary wing means, whereby the center of gravity of the helicopter when loaded will be located a substantial distance above said hub assembly.

2. The helicopter of claim 1 wherein said load carrying chassis includes a platform for a laterally shiftable weight whereby said center of gravity may be positioned to tilt said helicopter and control the direction of flight of said helicopter.

3. The helicopter of claim 2 wherein said hub assembly includes two hub members rotatively mounted on said connecting means one above the other and adjacent to each other, means for intergearing said hub members for counter-rotation thereof; and having motor means carried by said chassis and transmission means for transmitting rotative power from said motor means to said hub assembly.

4. The helicopter of claim 3 wherein said transmission means includes means for varying the torque distribution to said hub members to provide for azimuth control of said chassis.

5. The helicopter of claim 4 wherein said chassis forms a support for a standing operator and has a column attached thereto extending upwardly therefrom, and hand operated steering means carried by said column, connected to said torque distribution varying means.

6. The helicopter of claim 1 wherein said blades have a progressively decreasing bending stiffness from their root ends to their tips so that the mean bending stiffness outboard of their radial midpoints is from about 10% to 25% of their mean bending stiffness inboard of said midpoints.

7. The helicopter of claim 1 wherein said blades have a bending stiffness that varies inversely in proportion to the ratio of the blades' length to the length from the tip of the blade to the station measured raised to a power of about 4.5 to 5.75.

8. The helicopter of claim 3 wherein the root ends of said blades are rigidly attached to said hub members so that said blades have fixed positive coning angles.

9. The helicopter of claim 8 wherein the blades attached to the upper of said hub members have a greater coning angle than the coning angle of the blades attached to the lower of said hub members.

10. The helicopter of claim 9 wherein said blades have tip portions which are sufficiently flexible to bending stresses to avoid rolling forces and to minimize periodic stresses when said helicopter tilts and moves horizontally in flight and said blades progressively increase in bending stiffness toward their root ends so as to restrain said tip portions sufficiently to prevent interference between the blades connected to said upper and lower hub members.

11. The helicopter of claim 10 wherein said coning angles are fixed so that the tips of the blades attached to the upper of said hub members are spaced from the tips of the blades attached to the lower of said hub members by not more than about 12% of the radius of said rotary wing means.

12. The helicopter of claim 3 wherein said connecting means comprises a hollow shaft rigidly connected to the underside of said chassis having said hub assembly journalled thereon for rotation in a fixed plane parallel with the plane of said chassis and said hollow shaft having means for attaching a suspension load to said helicopter located within the inner portion of said hollow shaft.

13. The helicopter of claim 3 wherein landing gear means including water displacement means are attached to the lower portion of said connecting means whereby the direction of movement on water of said helicopter may be controlled by said tilting.

References Cited in the file of this patent

UNITED STATES PATENTS

| | | |
|---|---|---|
| 1,058,485 | Stiriz | Apr. 8, 1913 |
| 2,192,300 | Droitcour | Apr. 5, 1940 |
| 2,621,874 | Boyle | Dec. 16, 1952 |

FOREIGN PATENTS

| | | |
|---|---|---|
| 145,801 | Great Britain | 1922 |
| 658,376 | Germany | Mar. 31, 1938 |